US011678287B2

United States Patent
Lin

(10) Patent No.: US 11,678,287 B2
(45) Date of Patent: Jun. 13, 2023

(54) METHOD FOR ACTIVATING A "BASE STATION" FUNCTION IN AN IAB NODE

(71) Applicant: ORANGE, Issy-les-Moulineaux (FR)

(72) Inventor: Hao Lin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 164 days.

(21) Appl. No.: 17/286,146

(22) PCT Filed: Oct. 8, 2019

(86) PCT No.: PCT/FR2019/052383
§ 371 (c)(1),
(2) Date: Apr. 16, 2021

(87) PCT Pub. No.: WO2020/079349
PCT Pub. Date: Apr. 23, 2020

(65) Prior Publication Data
US 2021/0360562 A1 Nov. 18, 2021

(30) Foreign Application Priority Data
Oct. 17, 2018 (FR) ...................................... 1859589

(51) Int. Cl.
*H04W 40/22* (2009.01)
*H04W 40/24* (2009.01)
(Continued)

(52) U.S. Cl.
CPC ....... *H04W 56/0045* (2013.01); *H04W 40/22* (2013.01); *H04W 40/248* (2013.01);
(Continued)

(58) Field of Classification Search
CPC .... H04B 17/0082–409; H04B 3/02–26; H04L 7/0004–10; H04W 24/02–10;
(Continued)

(56) References Cited

U.S. PATENT DOCUMENTS 6,628,642 B1  9/2003  Mile'n et al.
2011/0268055 A1  11/2011  Patel et al.

OTHER PUBLICATIONS

International Search Report dated Feb. 18, 2020 for corresponding International Application No. PCT/FR2019/052383, filed Oct. 8, 2019.
(Continued)

*Primary Examiner* — Timothy J Weidner
(74) *Attorney, Agent, or Firm* — David D. Brush; Westman, Champlin & Koehler, P.A.

(57) ABSTRACT

An Integrated Access and Backhaul (JAB) node incorporates two functions, a so-called "base station" function and a so-called "mobile terminal" function. In order to limit the interferences between base stations, all IAB nodes in the same network must be synchronised with one another. In order to ensure this synchronisation, each IAB node may use a time shift value transmitted by its parent node. However, since an IAB architecture is an arborescent architecture, errors in measuring an estimated time shift value for a given IAB node have repercussions on the measurements of estimated time shift values for its child node and so on. Accordingly, the "base station" function of a child IAB node is not activated as long as a time shift value determined by its parent node does not meet a synchronisation criterion.

15 Claims, 3 Drawing Sheets

(51) Int. Cl.
    *H04W 56/00*     (2009.01)
    *H04W 74/00*     (2009.01)
    *H04W 74/08*     (2009.01)
    *H04W 84/02*     (2009.01)
    *H04W 84/20*     (2009.01)
    *H04W 88/08*     (2009.01)
    *H04W 88/12*     (2009.01)
    *H04W 92/02*     (2009.01)
    *H04W 92/12*     (2009.01)
    *H04W 92/20*     (2009.01)

(52) U.S. Cl.
    CPC ....... *H04W 56/003* (2013.01); *H04W 74/008* (2013.01); *H04W 74/0833* (2013.01); *H04W 84/02* (2013.01); *H04W 84/20* (2013.01); *H04W 88/08* (2013.01); *H04W 88/12* (2013.01); *H04W 92/02* (2013.01); *H04W 92/12* (2013.01); *H04W 92/20* (2013.01)

(58) Field of Classification Search
CPC ... H04W 40/005–38; H04W 48/02–20; H04W 56/0005–0095; H04W 74/002–0891; H04W 84/005–22; H04W 88/005–188; H04W 92/02–24
See application file for complete search history.

(56) References Cited

OTHER PUBLICATIONS

Written Opinion of the International Searching Authority dated Feb. 18, 2020 for corresponding International Application No. PCT/FR2019/052383, filed Oct. 8, 2019.

French Search Report and Written Opinion dated Jul. 11, 2019 for corresponding French Application No. 1859589, filed Oct. 17, 2018.

English translation of the Written Opinion of the International Searching Authority dated Feb. 25, 2020 for corresponding International Application No. PCT/FR2019/052383, filed Oct. 8, 2019.

METHOD FOR ACTIVATING A "BASE STATION" FUNCTION IN AN IAB NODE

CROSS-REFERENCE TO RELATED APPLICATIONS

This Application is a Section 371 National Stage Application of International Application No. PCT/FR2019/052383, filed Oct. 8, 2019, the content of which is incorporated herein by reference in its entirety, and published as WO 2020/079349 on Apr. 24, 2020, not in English.

1. FIELD OF THE INVENTION

The field of the invention is that of the deployment of cellular networks in the context of the 5G or $5^{th}$ generation of standards for mobile telephony. More specifically, the invention relates to so-called IAB (Integrated Access and Backhaul) cellular network architectures.

2. PRIOR ART AND ITS DRAWBACKS

In order to meet an increasing demand for broadband, the communication techniques used within the scope of 5G are based on the use of wide frequency bands in the frequency spectrum between 30 and 300 GHz. The use of these high frequencies has an impact on the range of the radio transmission of base stations that is reduced. As a result there is a densification of the distribution of base stations in order to compensate this reduction in range of the radio transmissions.

In order to meet this need for densification of the distribution of base stations, various cellular network architectures are proposed. From these cellular network architectures is the IAB architecture.

FIG. 1 shows such an IAB architecture. Such an architecture comprises a first IAB node 10, called donor node. The donor node 10 is connected to the core network CORE by means of a wired type connection 101. In the example shown in FIG. 1, the donor node 10 is connected to two other IAB nodes the node 12 and the node 13 by means of radio links 121 and respectively 131.

The node 12 is connected to another IAB node, the node 14 by means of a radio link 141. The node 13 is connected to another IAB node, the node 15 by means of a radio link 151. Finally, the node 15 is connected to another IAB node, the node 16 by means of a radio link 161.

Thus, the node 10 acts as parent for the nodes 12 and 13 that, themselves act as parent respectively for the nodes 14 and 15. Finally, the node 15 acts as parent for the node 16.

An IAB node incorporates two functions, a so-called "base station" function and a so-called "mobile terminal" function. When an IAB node, such as the node 12, for example, communicates with its parent node, here the node 10, the "mobile terminal" function is activated and the node 12 behaves as a mobile terminal in relation to the node 10. When the node 12 communicates with its child node, here the node 14, the "base station" function is activated and the node 12 behaves as a base station with regard to the node 14.

Thus, depending on the nature of the link that joins it to the IAB node with which it communicates, an IAB node performs a base station function or a mobile terminal function.

When the "base station" is activated in an IAB node, it controls the downlink transmission channels, that is to say the channels used to transmit data from the parent IAB node to the child node, and the uplink transmission channels, that is to say the channels used to transmit data from the child IAB node to the parent node, of its child IAB nodes. A child node receives scheduling signals transmitted by its parent node which transport in particular information relating to times for sending and/or times for receiving data to or from the child node, as well as the duration of these transmissions.

When a new IAB node connects for the first time to its parent node, the "mobile terminal" function is activated. In accordance with a procedure for establishing a connection known as RACH (Random Access Channel) procedure, the child node transmits a first message to the parent node called "preamble". In response to this first message, the parent node sends a message comprising a time shift value. Other messages are subsequently exchanged between the parent node and the child node in order to establish a mutual connection.

When a parent node sends a signal to a child node, the latter receives the signal sent with a delay due to the propagation time of the signal in the air and depending on the distance separating the parent node from the child node. Because of this delay, the signals sent by the child node to the parent node are not received by the latter at the time indicated in the scheduling signals which disrupts the management of the communications by the parent node.

The child node uses the time shift value received during the RACH procedure to correct this delay.

In order to limit the interferences between base stations when they operate in time-division duplex (TDD) mode, all of the AB nodes must be synchronised with one another. In order to ensure this synchronisation, each AB node may use the time shift value transmitted by its parent node.

However, since an IAB architecture is an arborescent architecture, errors in measuring an estimated time shift value for a given IAB node have repercussions on the measurements of estimated time shift values for its child node and so on. As a result the IAB nodes are not synchronised with one another in a sufficiently precise manner, which negatively impacts the execution of the "base station" function by the IAB nodes.

Therefore, there is a need for a technique for synchronising in a precise manner the various IAB nodes in the same network with one another in order to limit the interferences between them when the "base station" function is activated.

3. DISCLOSURE OF THE INVENTION

The invention meets this need by proposing a method for activating at least one function in a first communication equipment belonging to a communication network, the method comprising the following steps executed by a second communication equipment also belonging to the communication network:
  determining, depending on at least one propagation time of at least one first message sent by the first communication equipment to the second communication equipment, at least one first time shift value intended to be used to synchronise the first and the second communication equipment,
  verifying the compliance of said first time shift value with a precision criterion,
  when said first time shift value is compliant with the precision criterion, sending to the first communication equipment a command to activate said function.

Thus, the solution that is the subject matter of the invention consists in not activating the "base station" function of a child IAB node as long as a time shift value determined by its parent node does not meet a synchronisation criterion. In other words, so long as a time shift value does not meet a given precision condition, and that consequently the child node using this time shift value is not synchronised in a sufficiently precise manner with its parent node, then the child node is not authorised to activate the "base station" function. The authorisation to activate this function is given to it by its parent node that guarantees a precise synchronisation with its child nodes.

By ensuring that a child node is synchronised with its parent node before being able to activate the "base station" function and thus being able to become itself a parent node, the propagation of errors in measuring the time shift value of the child node to its child nodes is reduced.

Consequently, the solution that is the subject matter of the invention makes it possible to synchronise in a precise manner all of the IAB nodes in the same network.

In one embodiment of the activation method that is the subject matter of the invention, the function having been activated in the first equipment, the activation method comprises the following steps:
  determining, depending on at least one propagation time of at least one second message sent by the first communication equipment to the second communication equipment, at least one second time shift value,
  when said at least one second time shift value is not compliant with the precision criterion, sending to the first communication equipment a command to deactivate said function.

When the "base station" function is activated in a child node, the parent node continues to measure a time shift value by means of messages sent by the child node. If the parent node determines that the child node is no longer synchronised in a sufficiently precise manner with the parent node, the parent node transmits a command to deactivate the "base station" function to the child node. The child node can therefore no longer act as base station in relation to its own child nodes.

In one embodiment of the activation method that is the subject matter of the invention, when a time shift value is not compliant with the precision criterion, the activation method comprises a step of determining, depending on at least one propagation time of at least one third message sent by the first communication equipment to the second communication equipment, at least one third time shift value, said determination step being executed until said at least one third time shift value is compliant with the precision criterion.

When the "base station" function is deactivated in a child node, the parent node continues to measure a time shift value by means of messages sent by the child node that continues to behave as a mobile terminal in relation to its parent node. If the parent node determines that the child node is once again synchronised in a sufficiently precise manner with the parent node, the parent node transmits a command to activate the "base station" function to the child node. The child node can therefore once again act as base station in relation to its own child nodes.

In one embodiment of the activation method that is the subject matter of the invention, a time shift value is compliant with the precision criterion when a difference between said time shift value and a previous time shift value is below a first threshold.

In one embodiment of the activation method that is the subject matter of the invention, a time shift value is compliant with the precision criterion when at least two consecutive time shift values are determined with a margin of error below a second threshold.

Another object of the invention is a method for communicating between a first equipment and a second equipment both belonging to a communication network, the communication method being executed by the first equipment and comprising the following steps:
  sending at least one first message to the second communication equipment,
  receiving at least one first time shift value intended to be used to synchronise the first and the second communication equipment, said at least one first time shift value being determined depending on at least one propagation time of said at least one first message,
  receiving a command to activate a function in the first communication equipment sent by the second communication equipment when said first time shift value is compliant with a precision criterion.

In one embodiment of the communication method that is the subject matter of the invention, the function having been activated in the first equipment, the communication method comprises the following steps:
  sending at least one second message to the second communication equipment
  receiving at least one second time shift value, said at least one second time shift value being determined depending on at least one propagation time of said at least one second message,
  when said at least one second time shift value is not compliant with the precision criterion, receiving a command to deactivate said function.

In one embodiment of the communication method that is the subject matter of the invention, when a time shift value is not compliant with the precision criterion, the communication method comprises a step of receiving at least one third time shift value determined depending on at least one propagation time of at least one third message sent to the second communication equipment, said reception step being executed until said at least one third time shift value is compliant with the precision criterion.

In one embodiment of the communication method that is the subject matter of the invention, the first message comprises an attachment request from the first equipment.

In one embodiment of the communication method that is the subject matter of the invention, the messages sent by the first communication equipment are signalling messages.

In one embodiment of the communication method that is the subject matter of the invention, a time for sending at least one second message is adjusted depending on the first time shift value.

The invention also relates to a communication equipment, belonging to a communication network, capable of activating at least one function in another communication equipment belonging to said communication network, the communication equipment comprising means for:
  determining, depending on at least one propagation time of at least one first message sent by the other communication equipment, at least one first time shift value intended to be used to synchronise the other communication equipment with said communication equipment,
  verifying the compliance of said first time shift value with a precision criterion,
  when said first time shift value is compliant with the precision criterion, sending to the other communication equipment a command to activate said function.

Another object of the invention is a communication equipment, belonging to a communication network, capable of communicating with another communication equipment also belonging to said communication network, the communication equipment comprising means for:
- sending at least one first message to the other communication equipment,
- receiving at least one first time shift value intended to be used to synchronise the communication equipment with the other communication equipment, said at least one first time shift value being determined depending on at least one propagation time of said at least one first message,
- receiving a command to activate a function sent by the other communication equipment when said first time shift value is compliant with a precision criterion.

Finally, the invention relates to computer program products comprising program code instructions for implementing methods such as previously described, when they are executed by a processor.

Another aim of the invention is a computer-readable recording medium whereon computer programs are recorded comprising program code instructions for executing the steps of the methods according to the invention such as described above.

Such a recording medium may be any entity or device capable of storing the programs. For example, the medium may include a storage means, such as a ROM, for example a CD ROM or a microelectronic circuit ROM, or also a magnetic recording means, for example a USB key or a hard drive.

On the other hand, such a recording medium may be a transmissible medium such as an electrical or optical signal, which may be routed via an electrical or optical cable, by radio or by other means, so that the computer programs that it contains can be executed remotely. The programs according to the invention may particularly be downloaded on a network for example the Internet network.

Alternatively, the recording medium may be an integrated circuit wherein the programs are incorporated, the circuit being adapted to execute or to be used in the execution of the aforementioned methods that are the subject matter of the invention.

4. LIST OF FIGURES

Other aims, features and advantages of the invention will become more apparent upon reading the following description, given by way of simple illustrative, and non-limiting example, in relation with the figures, wherein.

5. DETAILED DESCRIPTION OF EMBODIMENTS OF THE INVENTION

Figure 1:
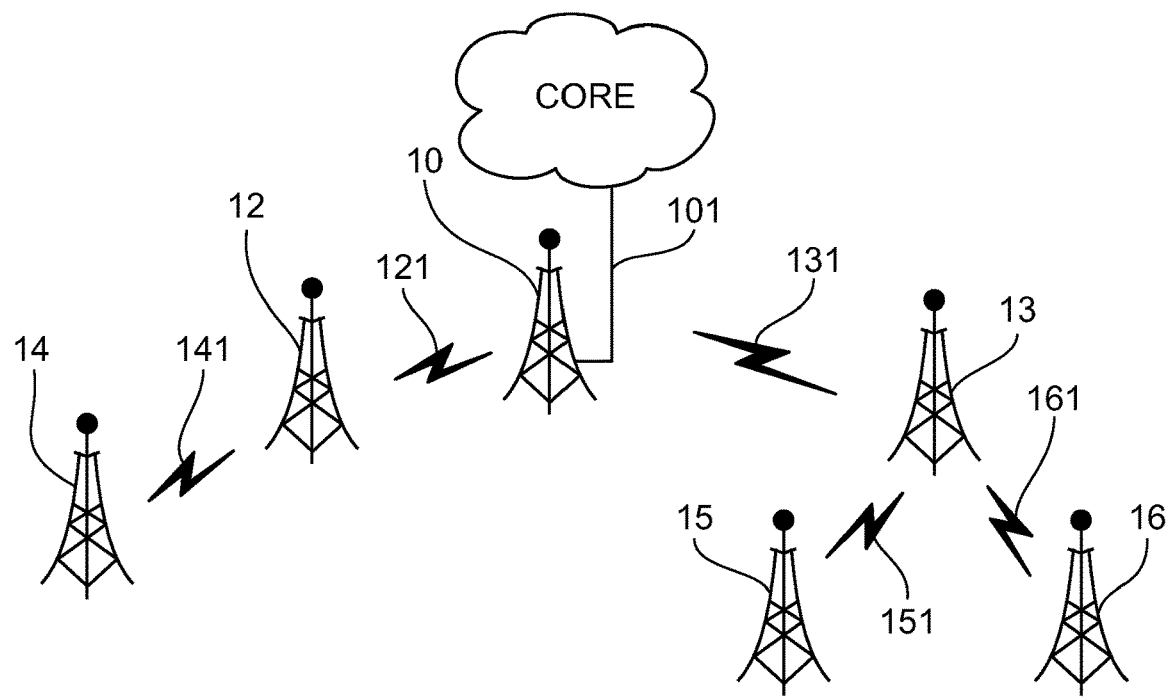
FIG. 1 shows an IAB architecture according to the prior art.
Figure 2:
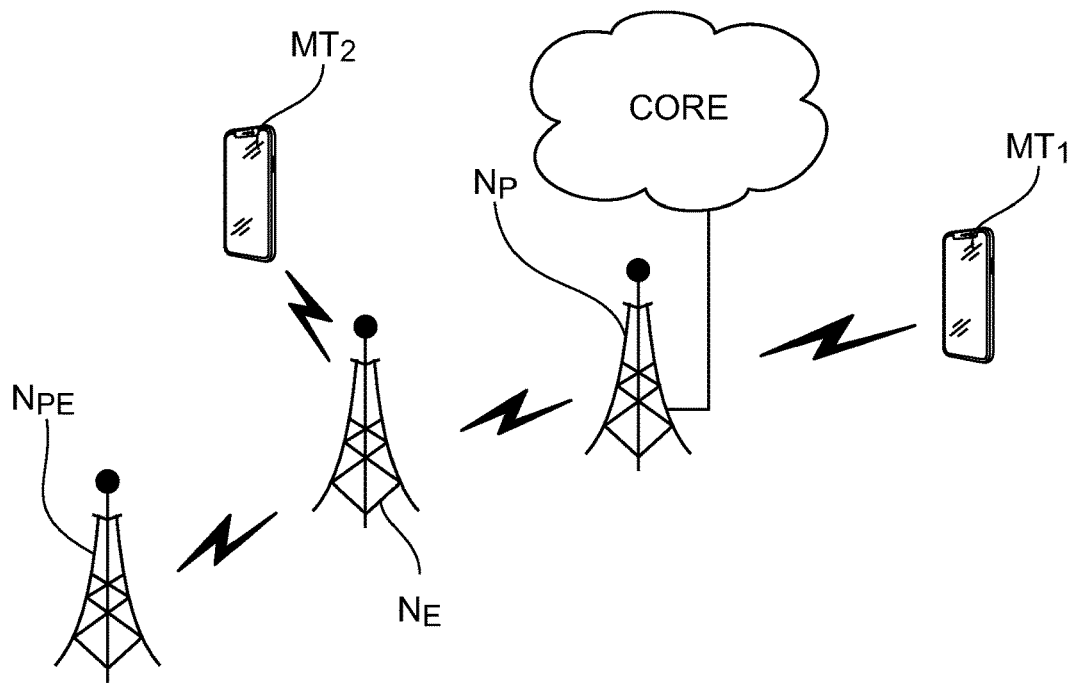
FIG. 2 shows a simplified IAB architecture wherein the invention is implemented according to its various embodiments.

FIG. 2 shows a simplified IAB architecture wherein the invention is implemented according to its various embodiments.

In this simplified architecture, a first IAB node known as parent node $N_P$ is connected by means of a wired connection to the core network CORE. The parent node $N_P$ is connected to a child IAB node $N_E$ and the child node is connected to a grandchild IAB node $N_{PF}$. The child node $N_E$ is a parent node for the grandchild node $N_{PE}$. A first mobile terminal $MT_1$ is attached to the parent node $N_P$ that acts as base station for the mobile terminal $MT_1$. A second mobile terminal $MT_2$ is attached to the child node $N_E$ that acts as base station for the mobile terminal $MT_2$.

Figure 3:
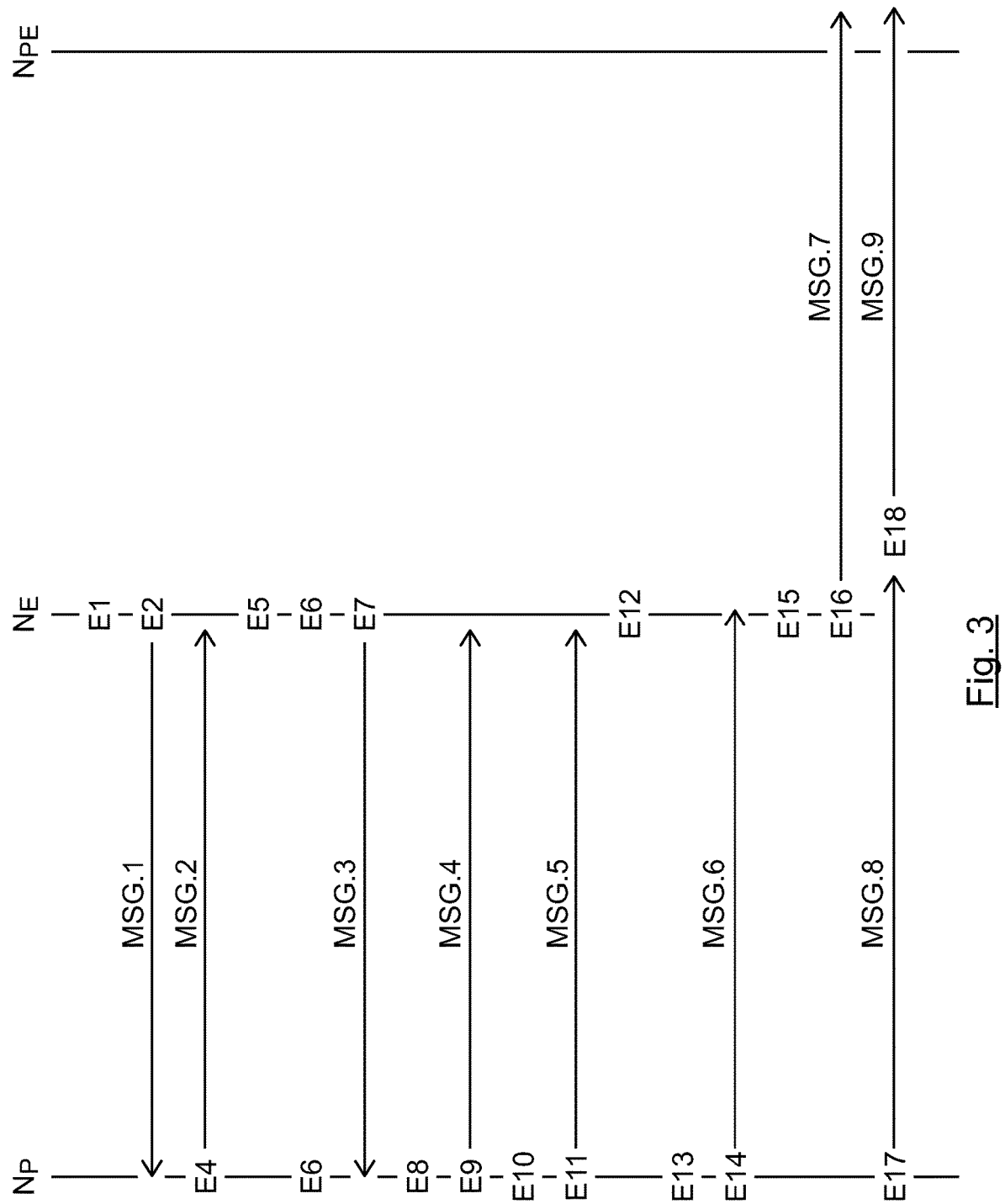
FIG. 3 shows the various steps implemented during the execution of methods for activating a function and for communicating according to one embodiment of the invention.

FIG. 3 shows the various steps implemented during the execution of methods for activating a function and for communicating according to one embodiment of the invention.

During step E1, the child node $N_E$ activates the "mobile terminal" function and listens, in specific frequency bands of the spectrum, to synchronisation signals sent by the parent node $N_P$. The synchronisation signals sent by the parent node $N_P$ comprise information about the time slicing of the radio transmission channel into time slots used by the parent node to communicate with its child nodes or mobile terminals, such as the mobile terminal $MT_1$, which are attached to the parent node $N_P$. Thus, the child node $N_E$ is informed of the time slot times used to communicate with the parent node $N_P$. The child node $N_E$ also obtains information about the destination of the time slots. Thus a first set of time slots is dedicated to the downlink transmission of data that is to say from the parent node $N_P$ to the child node $N_E$ or the mobile terminal $MT_1$. A second set of time slots is dedicated to the uplink transmission of data, that is to say from the child node $N_E$ or the mobile terminal $MT_1$ to the parent node $N_P$. Finally, a third set of so-called flexible time slots may be used for the downlink or uplink transmission of data depending on the needs.

Once all of this information is in its possession, the child node $N_E$ transmits an attachment request MSG1 to the parent node $N_P$ for example, during step E2. When the child node $N_E$ uses the RACH procedure to attach to the parent node $N_P$, the attachment request MSG1 is a "preamble" type message.

During step E3, the parent node $N_P$ determines a first time shift value TA depending on the propagation time of the attachment request sent by the child node $N_E$.

During step E4, the parent node $N_P$ sends a second MSG2 comprising the time shift value TA to the child node $N_E$.

In step E5, the child node $N_E$ uses the first time shift value TA received for two purposes. Firstly, the child node $N_E$ uses in a known manner the first time shift value TA received in order to anticipate the sending of upstream communications and thus to compensate the propagation time. Secondly, the child node $N_E$ uses the first time shift value TA in order to synchronise its internal clock with the parent node $N_P$. This first time shift value TA is not generally determined in a precise manner because only the propagation time of the attachment request is taken into account for the determination of the first time shift value TA.

During step E6, the parent node $N_P$ and the child node $N_E$ finalise the attachment procedure. At the end of step E6, the parent node $N_P$ is the base station of the child node $N_E$.

In step E7, the child node $N_E$ sends a third message MSG3 to the parent node $N_P$. Such a message MSG2 is a signalling message such as a DMRS (for Demodulation Reference Signal) or SRS (for Sounding Reference Signal) message.

In step E8, the parent node $N_P$ determines a new time shift value $TA_N$ depending on the propagation time of the third message sent by the child node $N_E$. In order to refine the determination of the new time shift value $TA_N$, the parent node $N_P$ may also filter the noise and/or the interferences of the signals received from the child node $N_E$.

During step E9, the parent node $N_P$ sends, to the child node $N_E$, a message MSG4 comprising the new time shift value $TA_N$. The child node $N_E$ uses the new time shift value $TA_N$ in order to adjust the times for sending upstream communications and in order to adjust the synchronisation of its internal clock with the parent node $N_P$.

During step E10, the parent node $N_P$ checks the compliance of the new time shift value $TA_N$ with a precision criterion CP. Such a precision criterion may take a plurality of forms according to the embodiments of the invention.

Thus, in a first embodiment the precision criterion CP is a threshold with which the new time shift value $TA_N$ is compared. The new time shift value $TA_N$ is compliant with the precision criterion CP if it is below the threshold.

In a second embodiment, the precision criterion CP is verified when a difference between a new time shift value $TA_N$ and another previously determined time shift value $TA_A$ is below a threshold.

In a third embodiment, the precision criterion CP is verified when at least two consecutively determined time shift values TA are determined with a margin of error below a threshold.

When the new time shift value is compliant with the precision criterion CP, the node $N_P$ sends, during step E10, a message MSG5 comprising a command to activate the "base station" function to the child node $N_E$.

In step E12, the child node $N_E$ activates the "base station" function and is capable of itself becoming a parent node of a grandchild node $N_{PE}$.

Steps E7 to E9 are executed in a more or less regular manner and as long as a connection is established between the parent node $N_P$ and the child node $N_E$.

If during step E13 executed after step E12, the parent node $N_P$ verifies the compliance of a new time shift value TA with a precision criterion CP and that this new time shift value is not compliant with the precision criterion CP, the node $N_P$ sends, during step E14, a message MSG6 comprising a command to deactivate the "base station" to the child node $N_E$. The parent node $N_P$ informs its own parent node, or if it does not have one, an equipment of the core network CORE of the situation of the child node $N_E$.

The child node $N_E$ deactivates the "base station" function during step E15.

The child node $N_E$ subsequently sends, in step E16 a message MSG7 to the grandchild node $N_{PE}$ informing it that it no longer acts as base station. If the grandchild node $N_{PE}$ itself acts as base station for other nodes of the architecture, it sends messages to these nodes in order to inform them.

If during step E17 executed after step E16, the parent node $N_P$ verifies the compliance of a new time shift value TA with a precision criterion CP and that this new time shift value is once again compliant with the precision criterion CP, the node $N_P$ sends a message MSG8 comprising a new command to activate the "base station" function to the child node $N_E$. The parent node $N_P$ informs its own parent node, or if it does not have one, an equipment of the core network CORE of the new situation of the child node $N_E$.

The child node $N_E$ reactivates the "base station" function during step E18 and subsequently sends a message MSG9 to the grandchild node $N_{PE}$ informing it that it once again acts as base station.

Figure 4:
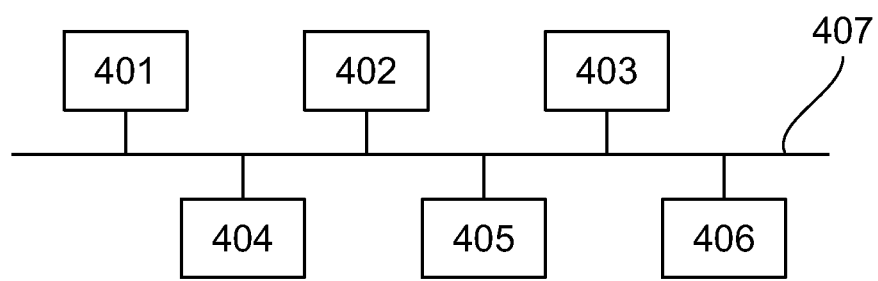
FIG. 4 shows an IAB node according to one embodiment of the invention.

FIG. 4 shows an IAB node according to one embodiment of the invention. Such an IAB node is capable of implementing the steps of the method described with reference to FIG. 3 according to whether it is a parent node or a child node.

An IAB node may comprise at least one hardware processor 401, one storage unit 402, one input device 403, one display device 404, one interface 405, and at least one network interface 406 that are mutually connected through a bus 407. Of course, the components of the IAB node may be connected by means of a connection other than a bus.

The processor 401 controls the operations of the IAB node. The storage unit 402 stores at least one program for implementing an activation method and a communication method according to one embodiment of the invention to be executed by the processor 401, and various data, such as parameters used for computations performed by the processor 401, intermediate computation data performed by the processor 401, etc. The processor 401 may consist of any known and suitable hardware or software, or of a combination of hardware and of software. For example, the processor 401 may consist of a dedicated hardware such as a processing circuit, or of a programmable processing unit such as a central processing unit that executes a program stored in its memory.

The storage unit 402 may consist of any suitable means capable of storing the program or the programs and data in a computer-readable manner. Examples of storage units 402 comprise computer-readable non-transitory storage media such as semiconductor memory devices, and magnetic, optical or magneto-optical recording media loaded in a read and write unit.

The input device 403 may consist of a keyboard, a pointing device such as a mouse to be used by a user to enter commands. The display device 404 may also consist of a display module, such as for example a Graphical User Interface (GUI).

The interface 405 provides an interface between the IAB node and an external device such as a mobile terminal MT1. The interface 405 may communicate with the external device via a wireless connection.

At least one network interface 406 provides a connection between the IAB node and another IAB node via a radio connection. The network interface 406 may provide if applicable a wired connection with the core network CORE.

The invention claimed is:

1. An activation method for activating at least one function in a first communication equipment belonging to a communication network, the method comprising the following steps executed by a second communication equipment also belonging to the communication network:
   determining, depending on at least one propagation time of at least one first message sent by the first communication equipment to the second communication equipment, at least one first time shift value to synchronise the first and the second communication equipment,
   verifying compliance of said first time shift value with a precision criterion, and
   in response to said first time shift value being compliant with the precision criterion, sending to the first communication equipment a command to activate said function.

2. The activation method according to claim 1 wherein, the function having been activated in the first equipment, the activation method comprises the following steps:
   determining, depending on at least one propagation time of at least one second message sent by the first communication equipment to the second communication equipment, at least one second time shift value, and
   in response to said at least one second time shift value being not compliant with the precision criterion, sending to the first communication equipment a command to deactivate said function.

3. The activation method according to claim 1 comprising, when a time shift value is not compliant with the precision criterion, determining, depending on at least a propagation time of at least one third message sent by the first communication equipment to the second communication equipment, at least one third time shift value, which is executed until said at least one third time shift value is compliant with the precision criterion.

4. The activation method according to claim 1 wherein a time shift value is compliant with the precision criterion when a difference between said time shift value and a previous time shift value is below a first threshold.

5. The activation method according to claim 1 wherein a time shift value is compliant with the precision criterion when at least two consecutive time shift values are determined with a margin of error below a second threshold.

6. A communication method for communicating between a first equipment and a second equipment both belonging to a communication network, the communication method being executed by the first equipment and comprising the following steps:
   sending at least one first message to the second communication equipment,
   receiving at least one first time shift value to synchronise the first and the second communication equipment, said at least one first time shift value being determined depending on at least one propagation time of said at least one first message, and
   receiving a command to activate a function in the first communication equipment sent by the second communication equipment in response to said first time shift value is being compliant with a precision criterion.

7. The communication method according to claim 6 wherein, the function having been activated in the first equipment, the communication method comprises the following steps:
   sending at least one second message to the second communication equipment
   receiving at least one second time shift value, said at least one second time shift value being determined depending on at least one propagation time of said at least one second message, and
   in response to said at least one second time shift value being not compliant with the precision criterion, receiving a command to deactivate said function.

8. The communication method according to claim 6 comprising, when a time shift value is not compliant with the precision criterion, receiving at least one third time shift value determined depending on at least one propagation time of at least one third message sent to the second communication equipment, which is executed until said at least one third time shift value is compliant with the precision criterion.

9. The communication method according to claim 6 wherein the first message comprises an attachment request from the first equipment.

10. The communication method according to claim 6 wherein the messages sent by the first communication equipment are signalling messages.

11. The communication method according to claim 7 wherein a time for sending at least one second message is adjusted depending on the first time shift value.

12. Communication equipment, belonging to a communication network, capable of activating at least one function in another communication equipment belonging to said communication network, the communication equipment comprising:
   a processor; and
   a non-transitory computer-readable medium comprising instructions stored thereon which when executed by the processor configure the communication equipment to:
      determine, depending on at least one propagation time of at least one first message sent by the other communication equipment, at least one first time shift value to synchronise the other communication equipment with said communication equipment,
      verifying compliance of said first time shift value with a precision criterion, and
      in response to said first time shift value being compliant with the precision criterion, sending to the other communication equipment a command to activate said function.

13. Communication equipment, belonging to a communication network, capable of communicating with another communication equipment also belonging to the communication network, the communication equipment comprising:
   a processor; and
   a non-transitory computer-readable medium comprising instructions stored thereon which when executed by the processor configure the communication equipment to:
      sending at least one first message to the other communication equipment,
      receiving at least one first time shift value to synchronise the communication equipment with the other communication equipment, said at least one first time shift value being determined depending on at least one propagation time of said at least one first message, and
      receiving a command to activate a function sent by the other communication equipment in response to said first time shift value being compliant with a precision criterion.

14. A non-transitory computer-readable medium comprising a computer program product stored thereon comprising program code instructions for implementing a method of activating at least one function in a first communication equipment belonging to a communication network, when the instructions are executed by a processor of a second communication equipment also belonging to the communication network, wherein the instructions configure the second communication equipment to:
   determine, depending on at least one propagation time of at least one first message sent by the first communication equipment to the second communication equipment, at least one first time shift value to synchronise the first and the second communication equipment,
   verify compliance of said first time shift value with a precision criterion, and
   in response to said first time shift value being compliant with the precision criterion, sending to the first communication equipment a command to activate said function.

15. A non-transitory computer-readable medium comprising a computer program product stored thereon comprising program code instructions for implementing a method of communicating between a first equipment and a second equipment, when the instructions are executed by a processor of the first communication equipment, wherein the first communication equipment and the second communication equipment both belong to a communication network, and the instructions configure the first communication equipment to:

send at least one first message to the second communication equipment, receive at least one first time shift value to synchronise the first and the second communication equipment, said at least one first time shift value being determined depending on at least one propagation time of said at least one first message, and receive a command to activate a function in the first communication equipment sent by the second communication equipment in response to said first time shift value being compliant with a precision criterion.

\* \* \* \* \*